United States Patent
Satish et al.

(10) Patent No.: US 8,935,154 B1
(45) Date of Patent: Jan. 13, 2015

(54) SYSTEMS AND METHODS FOR DETERMINING AUTHORSHIP OF AN UNCLASSIFIED NOTIFICATION MESSAGE

(75) Inventors: Sourabh Satish, Fremont, CA (US); Michael Hart, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 266 days.

(21) Appl. No.: 13/446,081

(22) Filed: Apr. 13, 2012

(51) Int. Cl.
*G06F 17/27* (2006.01)

(52) U.S. Cl.
USPC ........................... 704/9; 704/1; 704/10

(58) Field of Classification Search
CPC ........................................................ G06F 17/27
USPC ........................................................ 704/1, 9, 10
See application file for complete search history.

(56) References Cited

U.S. PATENT DOCUMENTS

| | | | |
|---|---|---|---|
| 7,590,603 B2 * | 9/2009 | Zhang et al. | 706/12 |
| 8,364,467 B1 * | 1/2013 | Bowman et al. | 704/9 |
| 8,473,451 B1 * | 6/2013 | Hakkani-Tur et al. | 707/602 |
| 2006/0161423 A1 * | 7/2006 | Scott et al. | 704/10 |
| 2007/0239433 A1 * | 10/2007 | Chaski | 704/9 |
| 2012/0136652 A1 * | 5/2012 | Moyle et al. | 704/9 |
| 2012/0159620 A1 * | 6/2012 | Seifert et al. | 726/22 |
| 2012/0246564 A1 * | 9/2012 | Kolo | 715/264 |
| 2012/0259619 A1 * | 10/2012 | Hall | 704/9 |
| 2013/0138427 A1 * | 5/2013 | de Zeeuw et al. | 704/9 |
| 2013/0191111 A1 * | 7/2013 | Goswami | 704/8 |
| 2013/0218553 A1 * | 8/2013 | Fujii et al. | 704/9 |

\* cited by examiner

*Primary Examiner* — Douglas Godbold
(74) *Attorney, Agent, or Firm* — Holland & Hart LLP

(57) ABSTRACT

A computer-implemented method for determining authorship of an unclassified notification message is described. An unclassified notification message with one or more target sentences is received. A message model based on one or more classified notification messages stored in a data storage device is retrieved. One or more linguistic analysis procedures are performed on the one or more target sentences. Results of the one or more linguistic analysis procedures are compared with one or more characteristics of the message model. The unclassified notification message is classified based on the results of the comparison.

16 Claims, 9 Drawing Sheets

SYSTEMS AND METHODS FOR DETERMINING AUTHORSHIP OF AN UNCLASSIFIED NOTIFICATION MESSAGE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

Computing systems may execute applications or programs that provide various functions and features to a user of the computing system. For example, applications may execute to perform financial related tasks, data storage related tasks, data organization related tasks, and the like. Applications may also execute to monitor events occurring on the computing system. These applications may identify events that may be malicious or harmful to the computing system. Upon detecting a harmful event, the applications may notify the user or take additional precautions. Applications or programs that monitor for harmful events may assist to protect the integrity of the computing system and the data stored or accessed by the system.

SUMMARY

According to at least one embodiment, a computer-implemented method for determining authorship of an unclassified notification message is described. An unclassified notification message with one or more target sentences is received. A message model based on one or more classified notification messages stored in a data storage device may be retrieved. One or more linguistic analysis procedures are performed on the one or more target sentences. Results of the one or more linguistic analysis procedures are compared with one or more characteristics of the message model. The unclassified notification message is classified based on the results of the comparison.

In one embodiment, the one or more linguistic analysis procedures include syntax parsing, stop word usage, or character language modeling. One or more syntax parsers may be applied to the one or more target sentences of the unclassified notification message. In one configuration, results of the one or more syntax parsers applied to the target sentences may be compared with results of one or more syntax parsers applied to sentences of one or more genuine notification messages and sentences of one or more misleading notification messages.

In one example, one or more stop words included in the one or more target sentences of the unclassified notification message may be identified. The one or more stop words of the target sentences may be compared with one or more stop words identified from sentences of one or more genuine notification messages and sentences of one or more misleading notification messages.

In one configuration, a first character language model may be applied to the one or more target sentences to determine a first probability. The first character language model may be based on a particular language. A second character language model may be applied to the one or more target sentences to determine a second probability. The second character language model may be based on a language model for a genuine notification messages. A third character language model may be applied to the one or more target sentences to determine a third probability. The third character language model may be based on a language model for misleading notification messages.

A computing device configured to determine authorship of an unclassified notification message is also described. The computing device may include a processor and memory in electronic communication with the processor. The memory may store computer executable instructions that when executed by the processor cause the processor to perform the steps of receiving an unclassified notification message with one or more target sentences, retrieving a message model based on one or more classified notification messages stored in a data storage device, performing one or more linguistic analysis procedures on the one or more target sentences, comparing results of the one or more linguistic analysis procedures with one or more characteristics of the message model, and classifying the unclassified notification message based on the results of the comparison.

A non-transitory computer-readable storage medium storing computer executable instructions is also described. When the instructions are executed by a processor, the execution of the instructions may cause the processor to perform the steps of receiving an unclassified notification message with one or more target sentences, retrieving a message model based on one or more classified notification messages stored in a data storage device, performing one or more linguistic analysis procedures on the one or more target sentences, comparing results of the one or more linguistic analysis procedures with one or more characteristics of the message model, and classifying the unclassified notification message based on the results of the comparison.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
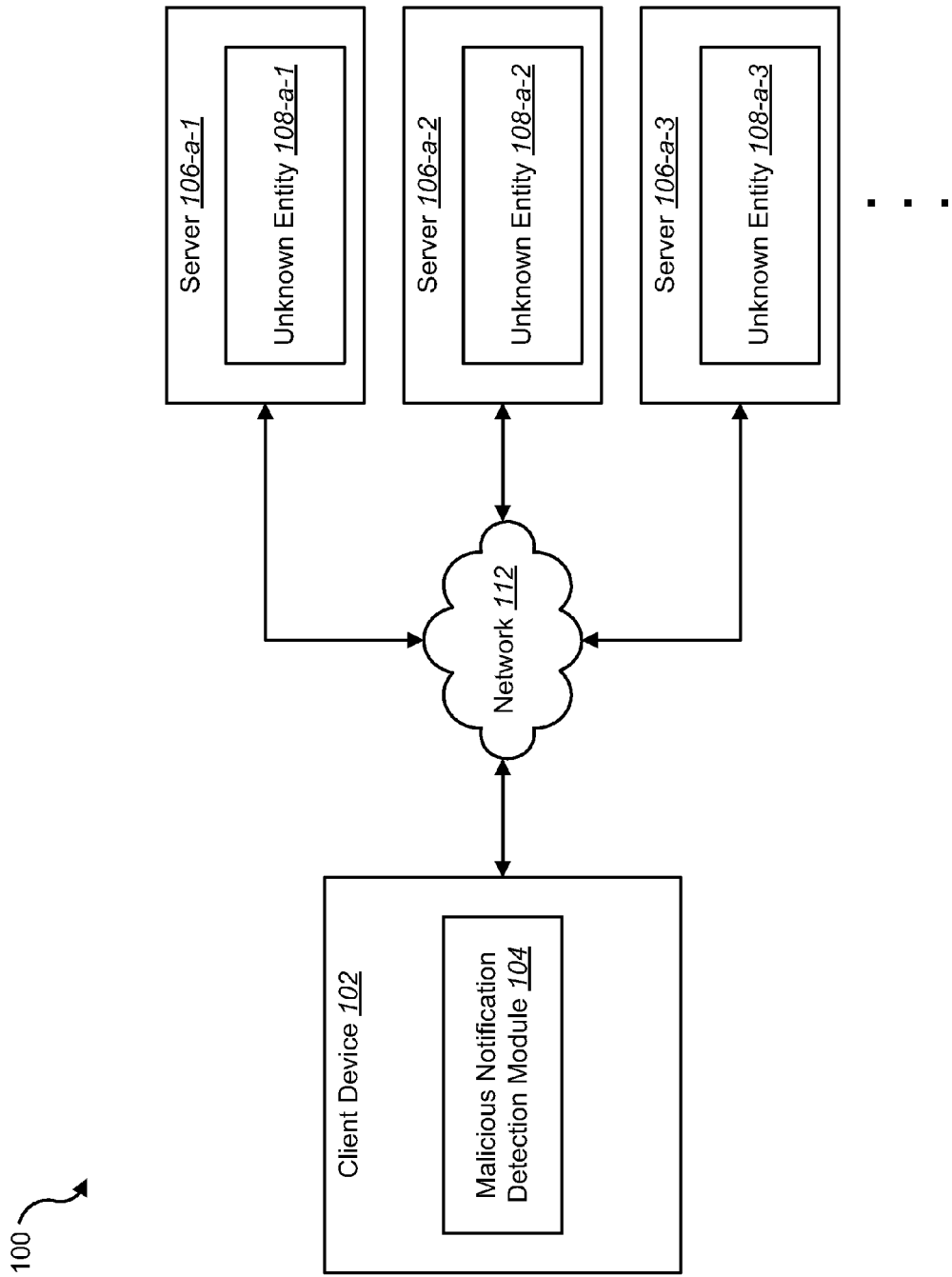
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Computing applications or programs may perform various functions. For example, security-based applications may monitor a computing to detect malicious applications attempting to execute (or actually executing) on the computing system. Applications that mislead users of computing systems, however, are becoming a more prominent threat. An example of a misleading application may include fake security software. In one form, the fake software may generate a notification message to inform a user of a fictitious threat. The notification message may inform the user that the threat (which is fictitious) may be remedied by purchasing certain software (such as the fake security software). In another form, the malware may blackmail the user. For example, the fake security software may encrypt files on the computing system and then provide a notification message to the user that includes the steps the user should do to decrypt the files. For example, the steps may include purchasing malicious software. In one example, misleading applications that implement these types of tactics may be referred to as scareware.

The present system and methods may detect scareware by employing various types of linguistic analysis on target sentences included in the notification messages generated by the scareware. For example, the present systems and methods may apply a parser that analyzes the syntax of a target sentence to determine if the syntax is syntactically similar to other examples of notification messages generated by scareware. In addition, the present systems and methods may identify the usage of stop words (i.e., and, the, is, etc.) within the target sentences to determine if the usage of the stop words is consistent with prior examples of scareware. Further, various language models may be applied to the target sentences to determine how anomalous the target sentences are with respect to normal usages of a particular language. The language models may also be applied to determine if the structure of the target sentences are similar to samples of message notifications generated by scareware and non-scareware applications.

FIG. 1 is a block diagram illustrating one embodiment of an environment 100 in which the present systems and methods may be implemented. In one configuration, a client device 102 may communicate with one or more servers 106 across a network 112 connection. In one example, the client device 102 may be a personal computer (PC), a laptop, a tablet, a smart phone, a personal digital assistant (PDA), or any other type of computing device. In one example, the client device 102 may include a malicious notification detection module 104. The module 104 may detect notification messages that originate from misleading applications, such as, but not limited to, scareware applications. Details regarding the malicious notification detection module 104 will be described below.

In one configuration, the one or more servers 106 may host an unknown entity 108. In another configuration, the unknown entity 108 may be installed on the client device 102. The unknown entity 108 may be an application or program that provides (or attempts to provide) notification messages to the client device 102. The malicious notification detection module 104 may analyze the notifications to determine whether the notifications include instructions and/or information that may be malicious or harmful to the client device 102 and/or to the user of the client device 102.

Figure 2:
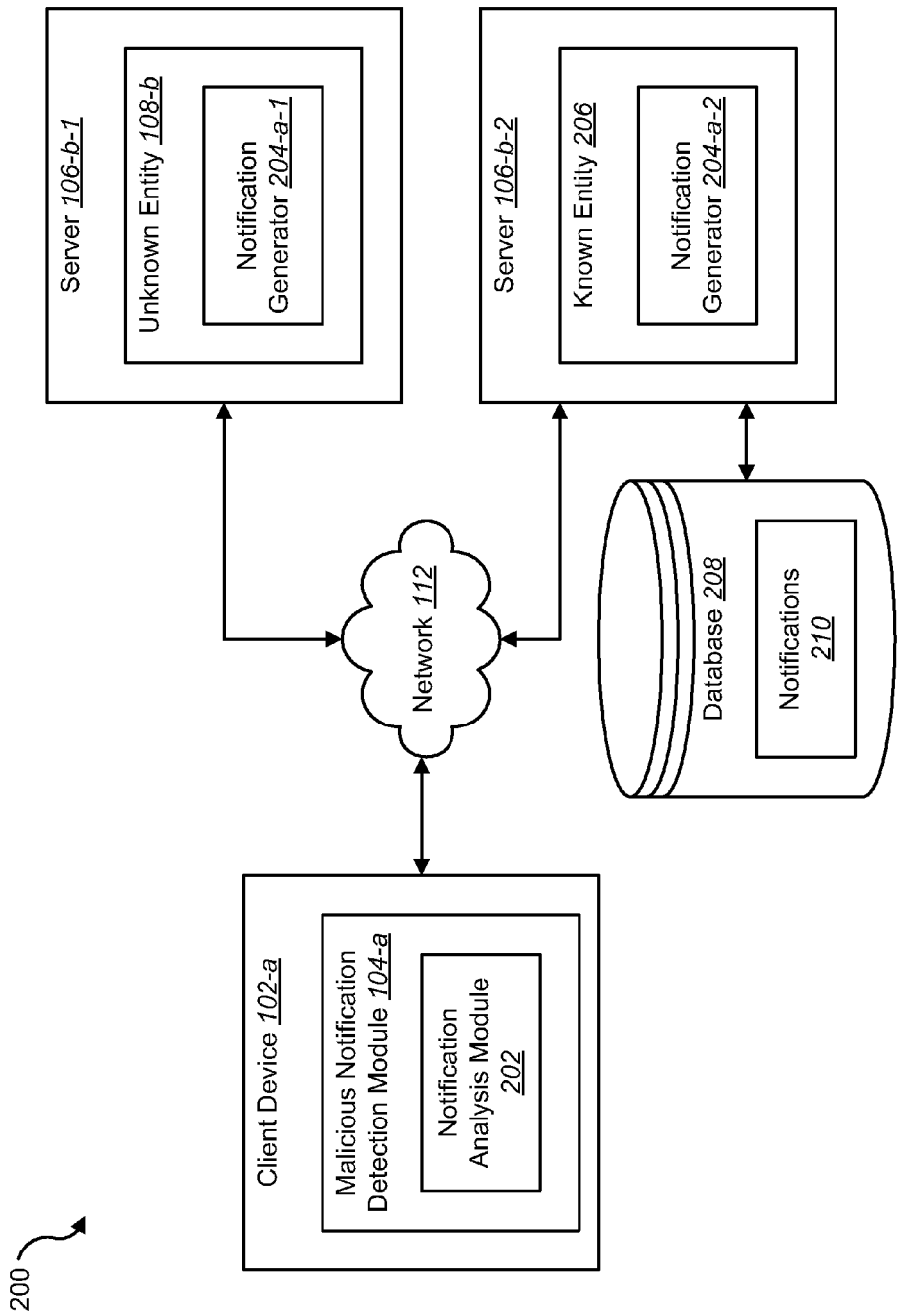
FIG. 2 is a block diagram illustrating a further embodiment of an environment in which the present systems and methods may be implemented.

FIG. 2 is a block diagram illustrating one embodiment of an environment 200 in which the present systems and methods may be implemented. In one configuration, a client device 102-a may communicate with one or more servers 106 across a network 112 connection. In one example, the client device 102-a may be an example of the client device 102 illustrated in FIG. 1. In addition, the one or more servers 106 may be examples of one or more servers 106 illustrated in FIG. 1.

As previous described, the client device 102-a may include a malicious notification detection module 104-a. The module 104-a may include a notification analysis module 202. In one embodiment, the notification analysis module 202 may analyze notification messages received from entities hosted by the one or more servers 106. In one embodiment, a first server 106-b-1 may host an unknown entity 108-b. An entity may be unknown if it has not been classified as a malicious entity, a non-malicious entity, as scareware, as malware, etc. A second server 106-b-2 may host a known entity 206 (e.g., an entity that has been classified as scareware, non-scareware, malicious, non-malicious, etc.). The unknown entity 108-b and the known entity 206 may include a notification generator 204. The notification generator 204 may generate notification messages. The messages may be sent to the client device 102-a. The messages may include information and/or instructions for the user of the client device 102-a. In one embodiment, a database 208 may store one or more notifications 210 that may be generated by the known entity 206.

In one configuration, when the client device 102-a receives a notification message, the notification analysis module 202 may compare various characteristics of the notification message with characteristics of the notifications 210 stored in the database 208. Based on the analysis and comparison performed by the notification analysis module 202, the received notification message may be classified as a genuine notification message or a malicious notification message. If the message is classified as a genuine message, the entity that originated the message may also be classified as a legitimate entity (e.g., non-scareware). If, however, the message is identified as being a misleading message (e.g., malicious), the entity that originated the message may be classified as being malicious (e.g., scareware). As a result, the malicious notification detection module 104-*a* may determine whether a notification message is genuine or misleading by identifying the author that originated the message. In addition, the malicious notification detection module 104-*a* may identify the application (e.g., anti-virus application, media application, etc.) that authored the notification message. Based on the identified author, malicious notification detection module 104-*a* may determine whether the notification message is genuine or misleading.

In one example, a notification message may be received from the unknown entity 108-*b*. The unknown entity 108-*b* may reside on a server 106. In another example, the unknown entity 108-*b* may reside on the client device 102. The message may include one or more sentences that may be referred to as target sentences. The notification analysis module 202 may analyze the notification message by comparing various characteristics of the message with characteristics of the notifications 210 previously generated by the known entity 206 and stored in the database 208. If the notification analysis module 202 determines that the notification message received from the unknown entity 108-*b* is genuine, the malicious notification detection module 104-*a* may allow the notification to be displayed or provided to the user of the client device 102-*a*. If, however, the notification analysis module 202 determines that the received notification is misleading, the malicious notification detection module 104-*a* may prevent the notification from being displayed to the user of the client device 102-*a*. In addition, the malicious notification detection module 104-*a* may provide a warning message to the user of the client device 102-*a*. The warning message may inform the user that the received notification may be a notification sent from a malicious entity, such as, but not limited to, a scareware application.

Figure 3:
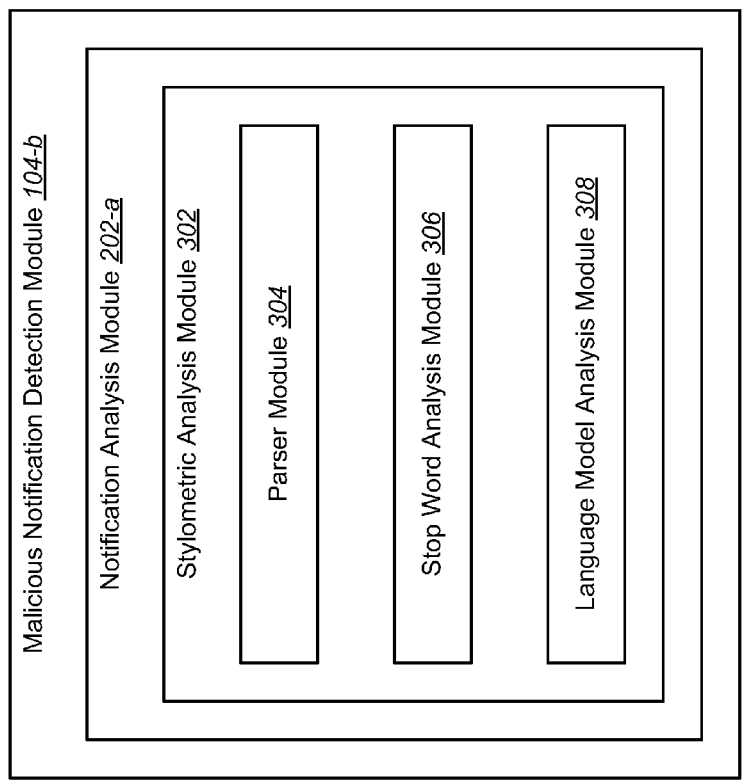
FIG. 3 is a block diagram illustrating one embodiment of a malicious notification detection module.

FIG. 3 is a block diagram illustrating one embodiment of a malicious notification detection module 104-*b*. The malicious notification detection module 104-*b* may be an example of the module 104 described in FIG. 1 or 2. In one configuration, the module 104-*b* may include a notification analysis module 202-*a*. The notification analysis module 202-*a* may include a stylometric analysis module 302. The module 302 may include a parser module 304, a stop word analysis module 306, and a language analysis module 308. Details regarding the stylometric analysis module 302 will be described below.

Recent results from authorship attribution subfield of computation linguistics indicate that authors may exhibit stylometric signatures (or linguistic patterns) at syntactic levels (i.e., structural/grammatical). These authors may be the authors of notification messages generated by the known and unknown entities described above. An author may be an individual or a collective group of people. In one embodiment, to identify these linguistic patterns, a probabilistic context free grammar (PCFG) may be utilized on the target sentences of the notification messages. A PCFG may be used to assign parts of speech to the words included in the target sentences. The PCFG may begin with a start symbol that expands with successive productions. For example, a simple context free grammar may include the following set of sub-rules: target sentence (S), noun phrase (NP), verb phrase (VP), NP, NP, etc. PCFGs may be useful for syntax parses by associating probabilities with the right-hand side of the rule. As a result, a rule set may lead to several plausible derivations for a target sentence with an associated probability of the likelihood that this derivation was generated by this particular author.

In one embodiment, the parser module 304 may select a parse that has the highest likelihood based on multiplying the probabilities for each expansion. To learn the stylistic properties of a particular author, sentences may be collected from the author. A generic PCFG may build a tree bank of the sentence parses for each of the sample sentences. A custom PCFG may be trained for the author that captures the syntactic pattern of the author. The syntactic patterns may be derivations of rules that occur close to the root or start of the derivation. Authorship of a particular notification message may be determined by identifying the most likely parser (i.e., the PCFG that had the greatest probability) from a set of PCFG parses trained for specific authors.

In one embodiment, to identify scareware using the parser module 304, examples of notification messages generated by known scareware may be collected in addition to notification messages generated by legitimate applications. The parser module 304 may apply one or more parsers to the target sentences of an unclassified notification message generated by an unknown entity. In addition, the parser module 304 may include a machine classifier that compares the minimum, maximum, average, standard deviation, and count of all sentences for each parser to determine authorship of the unclassified notification message. For example, the parser module 304 may determine whether the unclassified notification message was generated by an author of scareware software or an author of legitimate software.

The stop word analysis module 306 may be used to identify stop words that appear in target sentences of an unclassified notification message. For example, authorship identification may be achieved by investigating a class of words commonly known as stop words. Examples of these common words may include, but is not limited to, "is", "that", "was", "the", "and", etc. In one embodiment, stop words may constitute half or more of the words in the target sentences of an unclassified notification message. In one configuration, the analysis of stop words by the stop word analysis module 306 may provide a potential avenue for authorship identification.

In one example, the stop word analysis module 306 may take samples of notification messages generated by scareware and notification messages generated by genuine notifications. The stop word analysis module 306 may identify one or more stop words included in these messages and represent the different messages as a bag of stop words. The stop word analysis module 306 may further include one or more machine learning classifiers. Implementing the machine learning classifiers on target sentences where the feature space may be entirely composed of these stop words may provide authorship identification. Examples of these machine learning classifiers may include, but are not limited to, Support Vector Machines and Naive Bayesian classifiers. The stop word analysis module 306 may use a freely available collection of stop words. This list may also be augmented by identifying custom words that are common across different types of applications, including scareware.

In one configuration, the stop word analysis module 306 may analyze an unclassified notification message with one or more target sentences to determine whether the author of the message is likely to be an author of scareware. The module 306 may identify one or more stop words included in the target sentences. The module 306 may identify the percentage of stop words used, the pattern of the usage of the stop words within the target sentences, etc. and compare these results with stop word usage patterns of notification messages of known scareware applications and known legitimate applications. Based on the results of the analysis by the module 306, the unknown entity that originated the unclassified notification message may be classified as scareware or a legitimate application.

In one embodiment, the language model analysis module 308 may also be used to identify authorship of an unclassified notification message. In one configuration, the module 308 may assign a probability to a sequence of input. This input may be words, character sub sequences, or other tokens extracted from the sequence of input. The input may be one or more target sentences of an unclassified notification message received from an unknown entity.

The language model analysis module 308 may detect stylistic differences of the unclassified notification message by investigating the usage of character trigrams within the target sentences. Character trigrams may represent consecutive sequences of three character sequences including punctuation and whitespace. Utilizing trigrams, the language model analysis module 308 may build and apply three different models to the target sentences of the unclassified notification message. First, a trigram language model for a particular language (such as English) may be applied to determine if the text was generated by someone for whom English is a foreign language. If the language model does not model the input well, the module 308 may determine that it is likely the target sentences were written by an author with a poor command of the English language. Second, the module 308 may build a trigram language model for notification messages generated by legitimate applications. Third, the module 308 may build a trigram language model for notification messages generated by known scareware applications. From the probabilities computed by each of these models, the language model analysis module 308 may apply statistical techniques to determine if the set of probabilities indicate that the unclassified notification message could originate from a scareware application. For example, an unclassified notification message that appears to include poorly written English and is best modeled by the language model trained on scareware messages may likely be generated by an author of scareware, or other types of malware.

Figure 4:
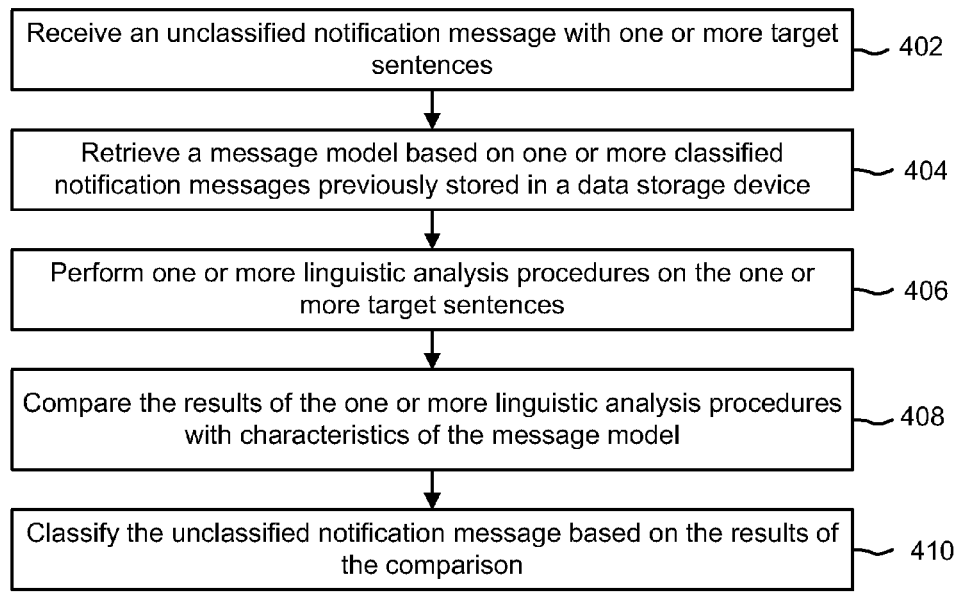
FIG. 4 is a flow diagram illustrating one embodiment of a method to determine authorship of an unclassified notification message received from an unknown entity.

FIG. 4 is a flow diagram illustrating one embodiment of a method 400 to determine authorship of an unclassified notification message received from an unknown entity. In one configuration, the method 400 may be implemented by the malicious notification detection module 104 of FIG. 1, 2 or 3.

At step 402, an unclassified notification message with one or more target sentences may be received. At step 404, a message model based on one or more classified notification messages previously stored in a data storage device may be retrieved. The message model may include graphical representation of the classified notification messages. The data storage device may include the database 208. The classified notification messages may be classified as notification messages originating from authors of genuine applications or authors of scareware applications. At step 406, one or more linguistic analysis procedures may be performed on the one or more target sentences. In addition, the linguist analysis procedures may be performed on the sentences of the one or more classified notification messages. In one configuration, the linguistic analysis procedures may be previously performed on the classified notification messages and the results may be stored in the data storage device with the classified messages.

At step 408, the results of the one or more linguistic analysis procedures performed on the unclassified notification message may be compared with characteristics of the message model. At step 410, the unclassified notification message may be classified based on the results of the comparison. For example, the unclassified notification message may be classified as being a message authored by an author of scareware applications, legitimate applications, malware applications, and the like.

Figure 5:
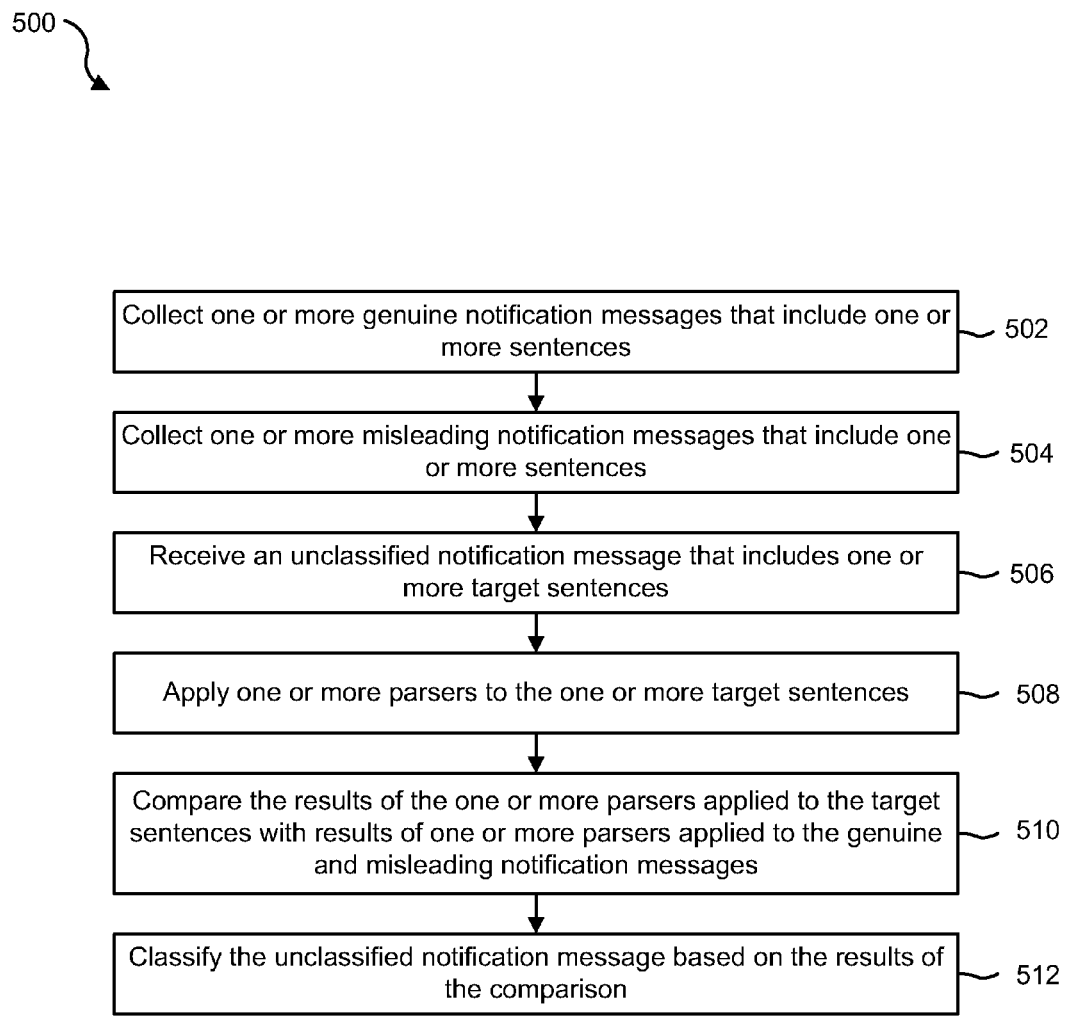
FIG. 5 is a flow diagram illustrating one embodiment of a method to determine authorship of an unclassified notification message using syntax parsing techniques.

FIG. 5 is a flow diagram illustrating one embodiment of a method 500 to determine authorship of an unclassified notification message using syntax parsing techniques. In one configuration, the method 500 may be implemented by the malicious notification detection module 104 of FIG. 1, 2 or 3. In particular, the method 500 may be implemented by the parser module 304 of FIG. 3.

At step 502, one or more genuine notification messages may be collected that include one or more sentences. The one or more genuine notification messages may originate from one or more legitimate applications. At step 504, one or more misleading notification messages may be collected that include one or more sentences. The misleading messages may originate from scareware applications, malware applications, and the like. At step 506, an unclassified notification message may be received that includes one or more target sentences. At step 508, one or more parsers may be applied to the one or more target sentences. In addition, one or more parsers may be applied to the sentences of the genuine and misleading notification messages. At step 510, the results of the one or more parsers applied to the target sentences may be compared with results of the one or more parsers applied to the genuine and misleading notification messages. At step 512, the unclassified notification message may be classified based on the results of the comparison. For example, the unclassified notification message may be classified as a message being authored by an author of scareware applications, malware applications, or legitimate applications.

Figure 6:
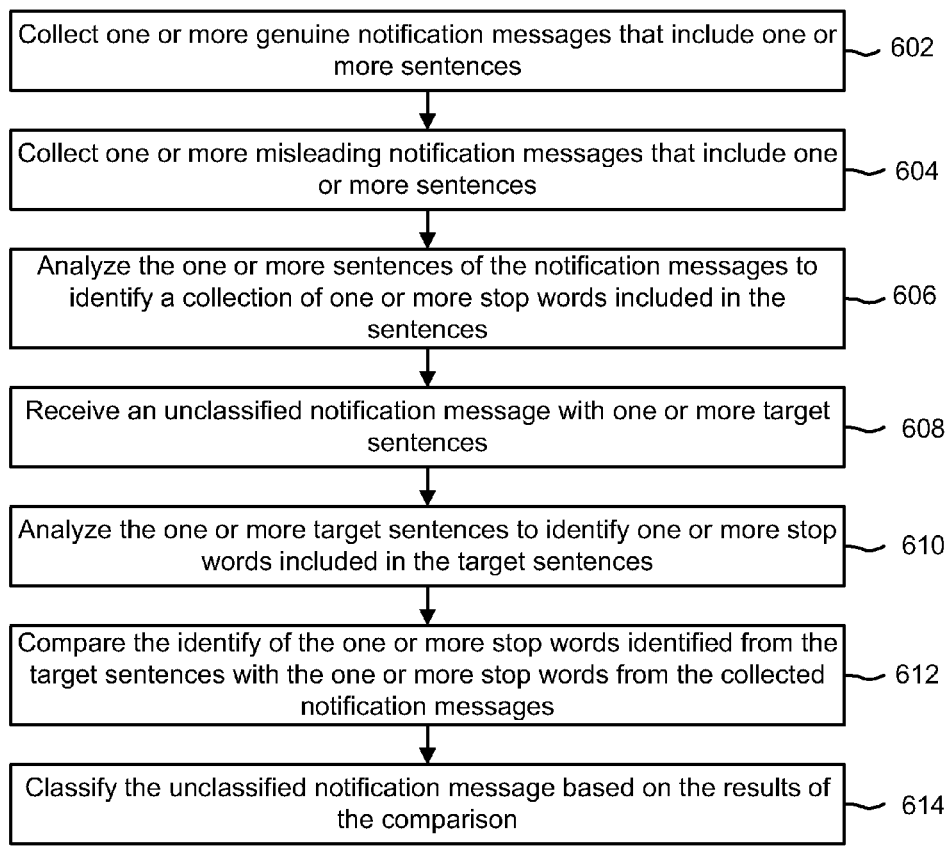
FIG. 6 is a flow diagram illustrating one embodiment of a method to identify authorship of an unclassified notification message using stop word techniques.

FIG. 6 is a flow diagram illustrating one embodiment of a method 600 to identify authorship of an unclassified notification message using stop word techniques. In one embodiment, the method 600 may be implemented by the malicious notification detection module 104 of FIG. 1, 2 or 3. In particular, the method 600 may be implemented by the stop word analysis module 306 of FIG. 3.

At step 602, one or more genuine notification messages may be collected that include one or more sentences. At step 604, one or more misleading notification messages may be collected that include one or more sentences. At step 606, the one or more sentences of the collected notification messages may be analyzed to identify a collection of one or more stop words included in the sentences. Stop words may include, but are not limited to, "the", "and", "an", etc. The analysis may include identifying a percentage of stop words used in the sentences as well as a usage pattern of the stop words within the sentences.

At step 608, an unclassified notification message may be received with one or more target sentences. At step 610, the one or more target sentences may be analyzed to identify one or more stop words included in the target sentences. The analysis may identify the percentage of stop words used in the target sentences as compared with the other words within the target sentences. The analysis may also include a usage pattern of the stop words within the target sentences. For example, the analysis may indicate that a stop word may be every third word of the target sentences. At step 612, the identity, usage pattern, percentage, etc. of the one or more stop words identified from the target sentences may be compared with the usage pattern, percentage, identify, etc. of the one or more stop words from the collected notification messages. At step 614, the unclassified notification message may be classified and based on the results of the comparison. The classification may indicate whether the notification message originated from an author of scareware applications or legitimate applications.

Figure 7:
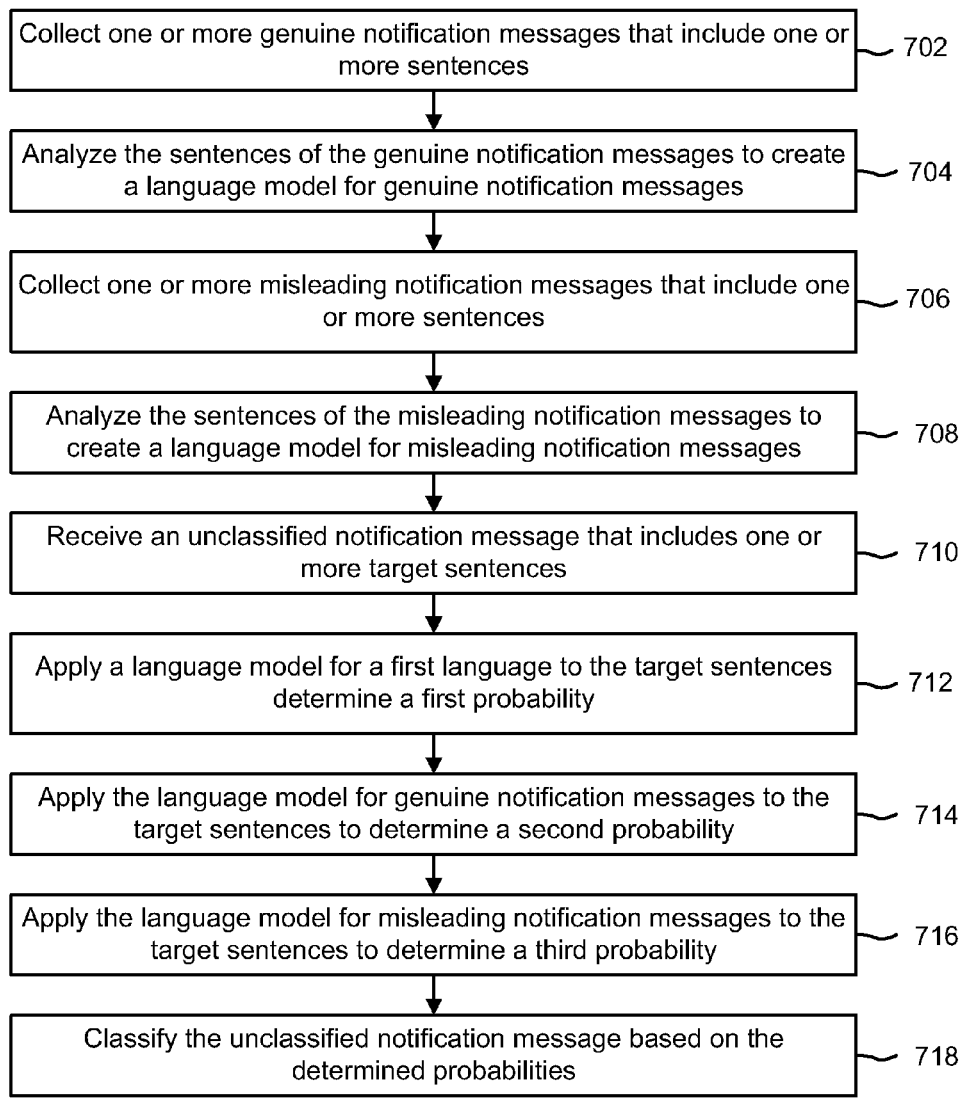
FIG. 7 is a flow diagram illustrating one embodiment of a method to determine authorship of an unclassified notification message based upon character language modeling techniques.

FIG. 7 is a flow diagram illustrating one embodiment of a method 700 to determine authorship of an unclassified notification message based upon character language modeling techniques. In one embodiment, the method 700 may be implemented by the malicious detection of notification module 104 of FIG. 1, 2 or 3. In particular, the method 700 may be implemented by the language model analysis module 308 of FIG. 3.

At step 702, one or more genuine notification messages may be collected that include one or more sentences. At step 704, the sentences of the genuine notification messages may be analyzed to create a language model for genuine notification messages. At step 706, one or more misleading notification messages may be collected that include one or more sentences. At step 708, the sentences of the misleading notification messages may be analyzed to create a language model for misleading notification messages.

In one embodiment, at step 710, an unclassified notification message that includes one or more target sentences may be received. At step 714, a language model for a first language may be applied to the target sentences to determine a first probability. At step 714, the language model for genuine notification messages may be applied to the target sentences to determine a second probability. At step 716, the language model for misleading notification messages may be applied to the target sentences to determine a third probability. At step 718, the unclassified notification messages may be classified as originating from an author of scareware applications or legitimate applications based on the determined probabilities. For example, the probabilities may be combined and a determination may be made as to whether the combination of the probabilities satisfies a particular threshold. In another example, a determination may be made as to whether any one of the probabilities satisfies the threshold. Based on the results of the determination, authorship of the unclassified notification message may be determined.

Figure 8:
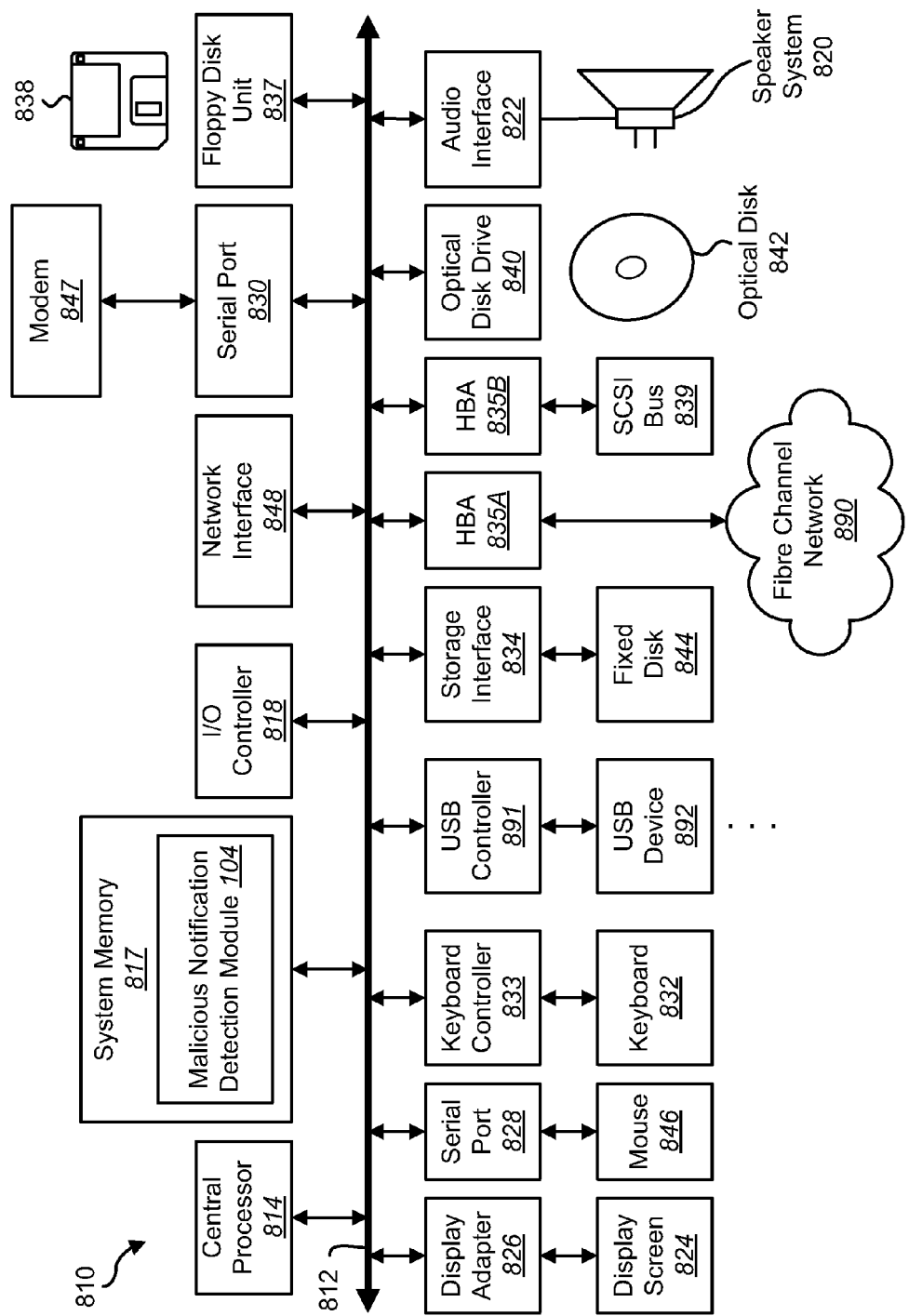
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 891), a storage interface 834, a floppy disk unit 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the malicious notification detection module 104 to implement the present systems and methods may be stored within the system memory 817. Applications resident with computer system 810 are generally stored on and accessed via a non-transitory computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in a non-transitory computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
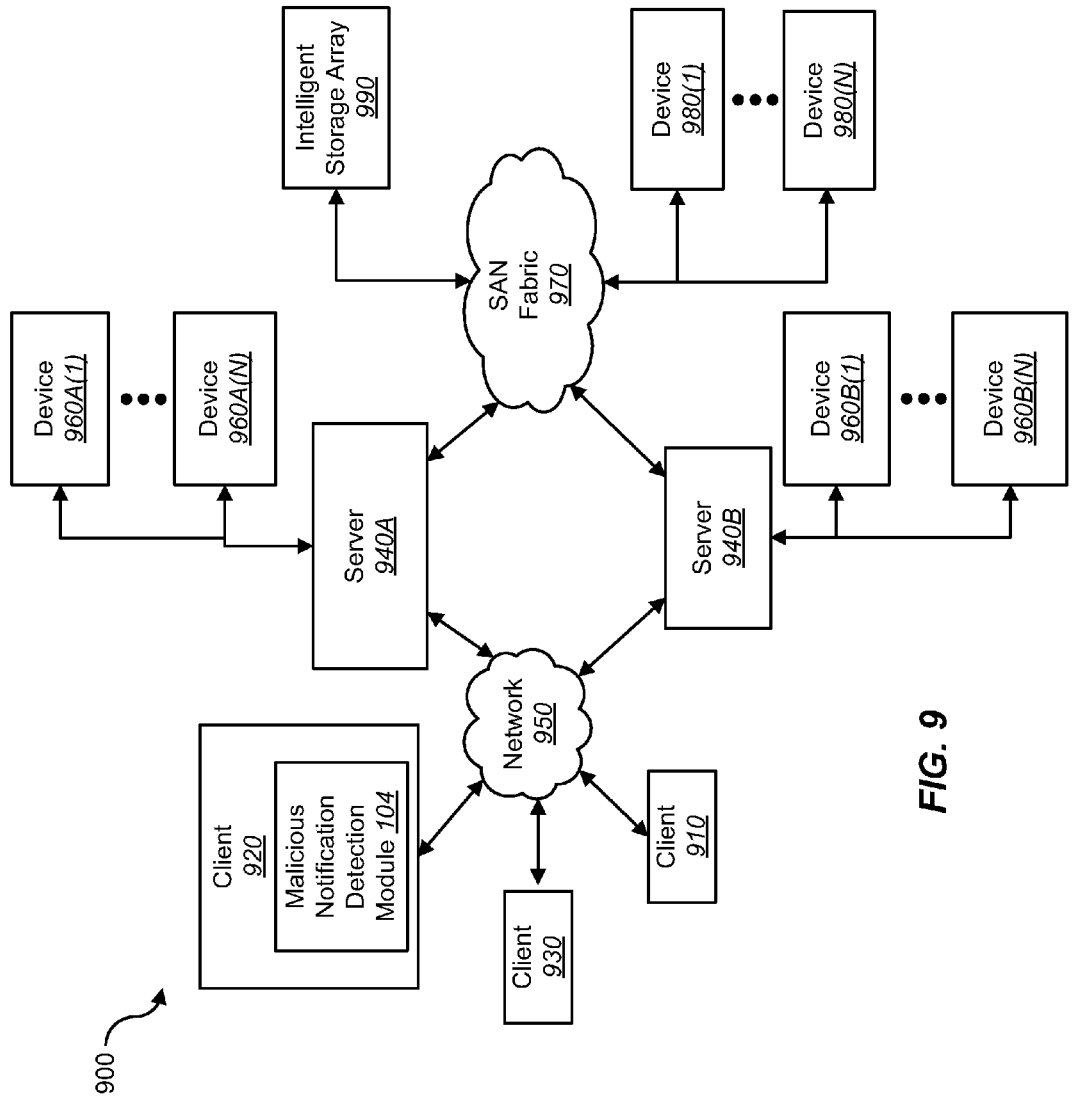
FIG. 9 is a block diagram depicting a network architecture in which client systems, as well as storage servers (any of which can be implemented using computer system), are coupled to a network.

FIG. 9 is a block diagram depicting a network architecture 900 in which client systems 910, 920 and 930, as well as storage servers 940A, 940B (any of which can be implemented using computer system 910), are coupled to a network 950. In one embodiment, the malicious notification detection module 104 may be located within the client systems 910, 920 and 930 to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A, 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920, and 930 to network 950. Client systems 910, 920, and 930 are able to access information on storage server 940A or 940B using, for example, a web browser or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to determine authorship of an unclassified notification message, comprising:
   receiving an unclassified notification message at a computing device, the unclassified notification message being generated by a potential scareware application, the unclassified notification message indicating a threat on the computing device, wherein the unclassified notification message comprises one or more target sentences;
   retrieving, by a hardware processor, a message model based on one or more classified notification messages stored in a data storage device;
   performing, by the hardware processor, one or more linguistic analysis procedures on the one or more target sentences;
   identifying one or more stop words included in the one or more target sentences of the unclassified notification message;
   comparing the one or more stop words of the target sentences with one or more stop words identified from sentences of one or more genuine notification messages and sentences of one or more misleading notification messages;
   comparing, by the hardware processor, results of the one or more linguistic analysis procedures with one or more characteristics of the message model; and
   classifying, by the hardware processor, the unclassified notification message based on the results of the comparisons.

2. The method of claim 1, wherein the one or more linguistic analysis procedures comprises syntax parsing, stop word usage, or character language modeling.

3. The method of claim 1, further comprising applying one or more syntax parsers to the one or more target sentences of the unclassified notification message.

4. The method of claim 3, further comprising comparing results of the one or more syntax parsers applied to the target sentences with results of one or more syntax parsers applied to sentences of one or more genuine notification messages and sentences of one or more misleading notification messages.

5. The method of claim 1, further comprising applying a first character language model to the one or more target sentences to determine a first probability, wherein the first character language model is based on a particular language.

6. The method of claim 1, further comprising applying a second character language model to the one or more target sentences to determine a second probability, wherein the second character language model is based on a language model for genuine notification messages.

7. The method of claim 1, further comprising applying a third character language model to the one or more target sentences to determine a third probability, wherein the third character language model is based on a language model for misleading notification messages.

8. A computing device configured to determine authorship of an unclassified notification message, comprising:
- a processor;
- memory in electronic communication with the processor, wherein the memory stores computer executable instructions that when executed by the processor cause the processor to perform the steps of:
  - receiving an unclassified notification message at a computing device, the unclassified notification message being generated by a potential scareware application, the unclassified notification message indicating a threat on the computing device, wherein the unclassified notification message comprises one or more target sentences;
  - retrieving a message model based on one or more classified notification messages stored in a data storage device;
  - performing one or more linguistic analysis procedures on the one or more target sentences;
  - identifying one or more stop words included in the one or more target sentences of the unclassified notification message;
  - comparing the one or more stop words of the target sentences with one or more stop words identified from sentences of one or more genuine notification messages and sentences of one or more misleading notification messages;
  - comparing results of the one or more linguistic analysis procedures with one or more characteristics of the message model; and
  - classifying the unclassified notification message based on the results of the comparisons.

9. The computing device of claim 8, wherein the one or more linguistic analysis procedures comprises syntax parsing, stop word usage, or character language modeling.

10. The computing device of claim 8, wherein the processor is further configured to perform the step of applying one or more syntax parsers to the one or more target sentences of the unclassified notification message.

11. The computing device of claim 10, wherein the processor is further configured to perform the step of comparing results of the one or more syntax parsers applied to the target sentences with results of one or more syntax parsers applied to sentences of one or more genuine notification messages and sentences of one or more misleading notification messages.

12. The computing device of claim 8, wherein the processor is further configured to perform the step of applying a first character language model to the one or more target sentences to determine a first probability, wherein the first character language model is based on a particular language.

13. The computing device of claim 8, wherein the processor is further configured to perform the step of applying a second character language model to the one or more target sentences to determine a second probability, wherein the second character language model is based on a language model for genuine notification messages.

14. The computing device of claim 8, wherein the processor is further configured to perform the step of applying a third character language model to the one or more target sentences to determine a third probability, wherein the third character language model is based on a language model for misleading notification messages.

15. A non-transitory computer-readable storage medium storing computer executable instructions that when executed by a processor cause the processor to perform the steps of:
- receiving an unclassified notification message at a computing device, the unclassified notification message being generated by a potential scareware application, the unclassified notification message indicating a threat on the computing device, wherein the unclassified notification message comprises one or more target sentences;
- retrieving a message model based on one or more classified notification messages stored in a data storage device;
- performing one or more linguistic analysis procedures on the one or more target sentences;
- identifying one or more stop words included in the one or more target sentences of the unclassified notification message;
- comparing the one or more stop words of the target sentences with one or more stop words identified from sentences of one or more genuine notification messages and sentences of one or more misleading notification messages;
- comparing results of the one or more linguistic analysis procedures with one or more characteristics of the message model; and
- classifying the unclassified notification message based on the results of the comparisons.

16. The non-transitory computer-readable storage medium of claim 15, wherein the one or more linguistic analysis procedures comprises syntax parsing, stop word usage, or character language modeling.

* * * * *